United States Patent
Hada (10) Patent No.: US 8,711,417 B2
(45) Date of Patent: Apr. 29, 2014

(54) INFORMATION PROCESSING APPARATUS, METHOD FOR CONTROLLING INFORMATION PROCESSING APPARATUS, AND STORAGE MEDIUM

(75) Inventor: Manabu Hada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 820 days.

(21) Appl. No.: 12/890,446

(22) Filed: Sep. 24, 2010

(65) Prior Publication Data
US 2011/0075218 A1    Mar. 31, 2011

(30) Foreign Application Priority Data
Sep. 28, 2009   (JP) ................. 2009-223459

(51) Int. Cl.
*G06K 15/00*   (2006.01)
(52) U.S. Cl.
USPC ........ 358/1.16; 358/1.13; 358/1.15; 711/111; 714/48; 714/53
(58) Field of Classification Search
USPC .............. 358/1.13, 1.14, 1.15, 1.16; 324/210, 324/212, 211, 213; 711/4, 111, 101, 112, 711/114; 714/6.11, 53, 1, 2, 48, 54
See application file for complete search history.

(56) References Cited

U.S. PATENT DOCUMENTS

| 8,427,692 B2 * | 4/2013 | Haga ................ 358/1.16 |
| 2002/0041396 A1 | 4/2002 | Ugajin et al. |

FOREIGN PATENT DOCUMENTS

| CN | 1462447 A | 12/2003 |
| CN | 1479308 A | 3/2004 |
| JP | 2002-116931 A | 4/2002 |
| JP | 2004-165741 A | 6/2004 |

* cited by examiner

*Primary Examiner* — Vu B Hang
(74) *Attorney, Agent, or Firm* — Canon USA, Inc., IP Division (57) ABSTRACT

An information processing apparatus, which includes a storage unit having a plurality of data areas, includes a measurement unit configured to measure a first data access speed in a first data area of the storage unit and a second data access speed in a second data area of the storage unit, and a detection unit configured to detect a defect at the first data area based on difference between the first data access speed and the second data access speed.

13 Claims, 10 Drawing Sheets

| AT TIME OF FACTORY SHIPMENT (MEASUREMENT DATE AND TIME) | AFTER OPERATION OF 'A' DAYS/HOURS | DELAY INFORMATION STORAGE UNIT |
|---|---|---|
| SECTOR#0 TRANSFER TIME INFORMATION | SECTOR#0 TRANSFER TIME INFORMATION | SECTOR#0 : (COUNT)(CONSECUTIVE COUNT) |
| SECTOR#1 TRANSFER TIME INFORMATION | SECTOR#1 TRANSFER TIME INFORMATION | SECTOR#1 : (COUNT)(CONSECUTIVE COUNT) |
| SECTOR#2 TRANSFER TIME INFORMATION | SECTOR#2 TRANSFER TIME INFORMATION | SECTOR#2 : (COUNT)(CONSECUTIVE COUNT) |
| SECTOR#3 TRANSFER TIME INFORMATION | SECTOR#3 TRANSFER TIME INFORMATION | SECTOR#3 : (COUNT)(CONSECUTIVE COUNT) |
| ... | ... | ... |
| SECTOR#n TRANSFER TIME INFORMATION | SECTOR#n TRANSFER TIME INFORMATION | SECTOR#n : (COUNT)(CONSECUTIVE COUNT) |

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to an image forming apparatus, a method for controlling an image forming apparatus, and a program.

2. Description of the Related Art

In recent years, a use of a mass-storage media such as a hard disk has been becoming crucial to an electrophotographic image forming apparatus, due to an increase in the program size as a result of the multifunctionalization, and an increase in the storage area for output and storage of high-resolution and high-gradation images. Accordingly, the importance of a hard disk has been significantly growing, and ever-increasing print speed and accessing of a multifunctionalized application to a hard disk are affecting the functionality and usability of the apparatus.

However, generally, a hard disk is prone to breakage. Once a tiny damage is made on the surface of a hard disk, that area turns into a so-called "bad sector". Such a bad sector may be in a "write-abort" state, and data may not be able to be written thereon normally. Other examples of failures that may occur on a bad sector include inability of normal reading. In this case, the reading retrying operation may be repeated over and over, resulting in an extreme slowdown of the data reading speed.

Therefore, such a bad sector may not only impair the overall performance of the apparatus, but also even make a startup of the image forming apparatus impossible depending on the location of a bad sector. A bad sector may be generated during a manufacturing process of a recording media, and may also be generated during operation by a strong impact from the outside, such as a contact between a head and the media. Further, in some cases, a bad sector is in a completely unreadable and unwritable state, while in other cases, a bad sector is yet to become completely unreadable and unwritable but cannot be normally read or written by one operation so that the retry operation is repeated over and over as mentioned above. In such a case, a bad sector may be a major factor in a slowdown of the data access speed.

With the aim of reducing bad sectors and operation failures, hard disk manufacturers, personal computer (PC) manufacturers, and software development companies have proposed various approaches. For example, device information called "Self-Monitoring, Analysis and Reporting Technology (SMART) information" including the number of alternative sectors, an OFF/ON count, a power-on time, and a seek time of a hard disk is stored in a memory or another storage. There is proposed the function of recommending replacement of a hard disk when these values reach predetermined certain values. Especially, the above-mentioned number of alternative sectors which are provided as an alternative in case of occurrence of a bad sector gains importance as a determination parameter for replacement of a hard disk.

However, since the criterion for determining a bad sector is established by hard disk manufacturers on their own accord, the following problem exists. For example, even if a sector slows down the transfer rate which is fatal to an image forming apparatus using the hard disk, this sector is not determined as a bad sector as long as it can be read by retrying operations within a certain time or a certain retrying count. Therefore, in this case, alternating of sector does not occur, and therefore the number of alternative sectors is not incremented. Further, an analysis of hard disks collected as faulty products from the market has revealed that most of them do not have a bad sector. In addition, in reality, most of them are determined as normal products even when the normal/faulty determination function is used which is a function of the SMART. In other words, the SMART information based on the manufacturers own rules is not sufficiently accurate, and a unique criterion should be established for an image forming apparatus using a hard disk. Under this circumstance, when the hard disks are further analyzed, it may become apparent that the transfer rates of some sectors are significantly reduced in many cases.

One conventional technique for solving this problem is a system which recommends replacement of a hard disk to a user before occurrence of an abnormal operation which might cause a slowdown of the access speed, by monitoring the access time of the hard disk (Japanese Patent Application Laid-Open No. 2004-165741). Another conventional technique is a system which monitors the access time of a hard disk, and sets a relevant area as a use prohibition area if the access speed is reduced to be lower than a preset value (Japanese Patent Application Laid-Open No. 2002-116931).

However, these conventional techniques do not discuss a method for measuring an access time of a hard disk, and a method for detecting an abnormal operation. According to the abnormal operation detection method in the above-mentioned conventional techniques, a certain value is preset, and an error cannot be detected until the criterion parameter comes down to a level low enough to affect the system, which leads to a problem in that the machine may suddenly break down. This problem becomes notable especially when a hard disk is replaced with a hard disk having a higher data access speed (for example, a hard disk manufactured by a different manufacturer or a hard disk of a different generation).

SUMMARY OF THE INVENTION

According to an aspect of the present invention, an information processing apparatus, which includes a storage unit having a plurality of data areas, includes a measurement unit configured to measure a first data access speed in a first data area of the storage unit and a second data access speed in a second data area of the storage unit, and a detection unit configured to detect a defect at the first data area based on difference between the first data access speed and the second data access speed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1A:
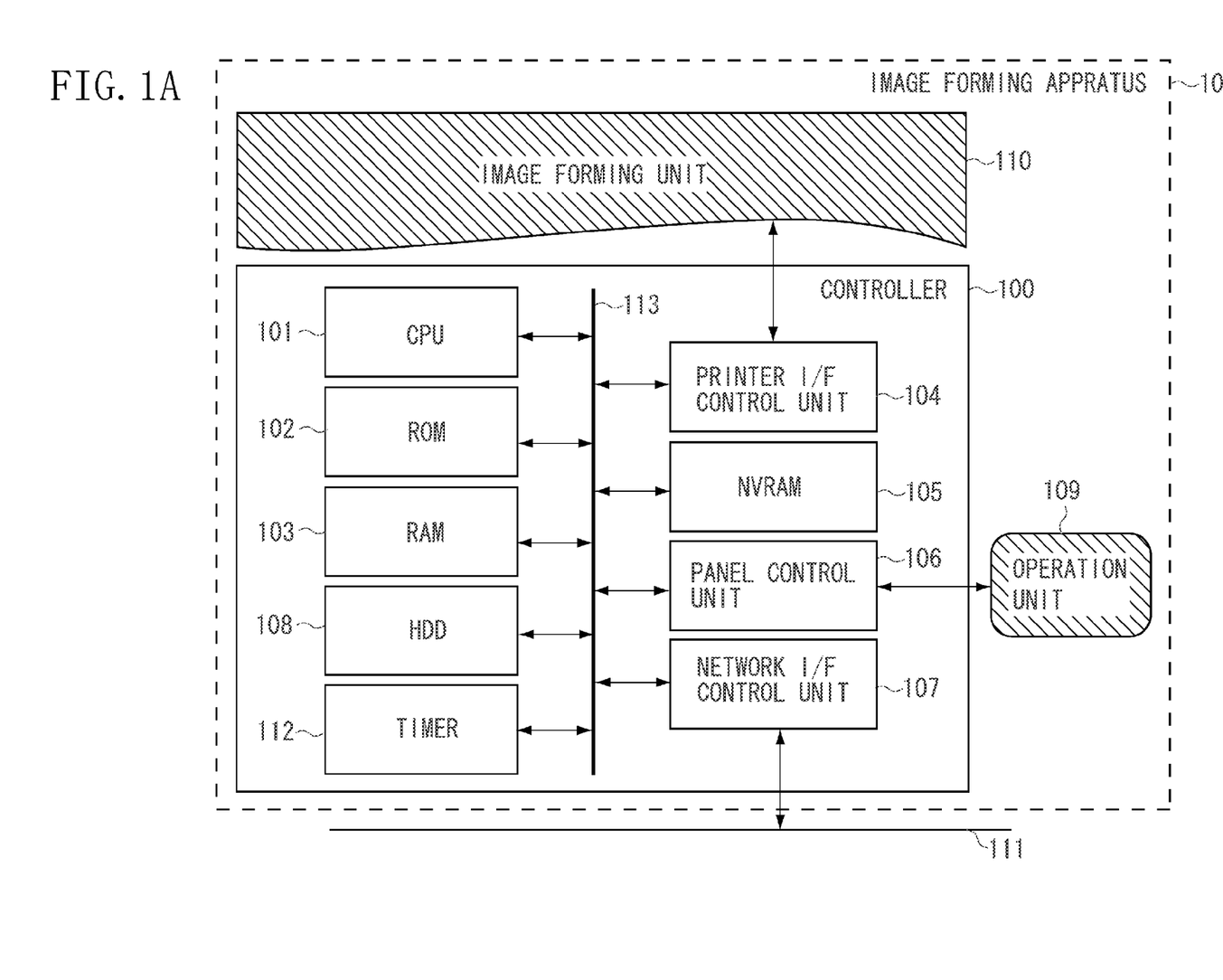
FIG. 1A is a block diagram illustrating a hardware configuration of an image forming apparatus.

A hardware configuration of an image forming apparatus 10 will be described with reference to FIG. 1A. The image forming apparatus 10 may be an information processing apparatus or may be part of an information processing apparatus. A controller 100 of the image forming apparatus 10 includes the following functions.

A central processing unit (CPU) 101 executes a software program in the image forming apparatus 10, and functions as a processing execution device for controlling the entire apparatus. A ROM 102 is a read-only memory, and stores a boot program of the apparatus, fixed parameters, and others. A RAM 103 is a random access memory, and is for use in, for example, temporal storage of data when the CPU 101 controls the apparatus. A hard disk (HDD) 108 is a hard disk drive, and is for use in storage of various data such as print data, an operation history log, index information associated with documents, and address information. A timer 112 manages an elapsed time in time counting processing, and functions as a measurement unit for measuring a transfer time of the hard disk 108 in the present exemplary embodiment. A printer interface (I/F) control unit 104 is a unit for controlling the image forming unit 110. A non-volatile random access memory (NVRAM) 105 functions as a first storage unit and a second storage unit for storing various setting values of the image forming apparatus 10, and a data transfer time of each partition/sector of the hard disk 108 in the present exemplary embodiment. A panel control unit 106 controls an operation unit 109 to display various information and input an instruction from a user. A network I/F control unit 107 controls transmission and reception of data to and from a local area network (LAN) 111. A bus 113 is connected to the CPU 101, the ROM 102, the RAM 103, the hard disk 108, the timer 112, the printer I/F control unit 104, the NVRAM 105, the panel control unit 106, and the network I/F control unit 107. The bus 113 is a system bus which transmits and receives a control signal from the CPU 101 and data signals among the units.

Figure 1B:
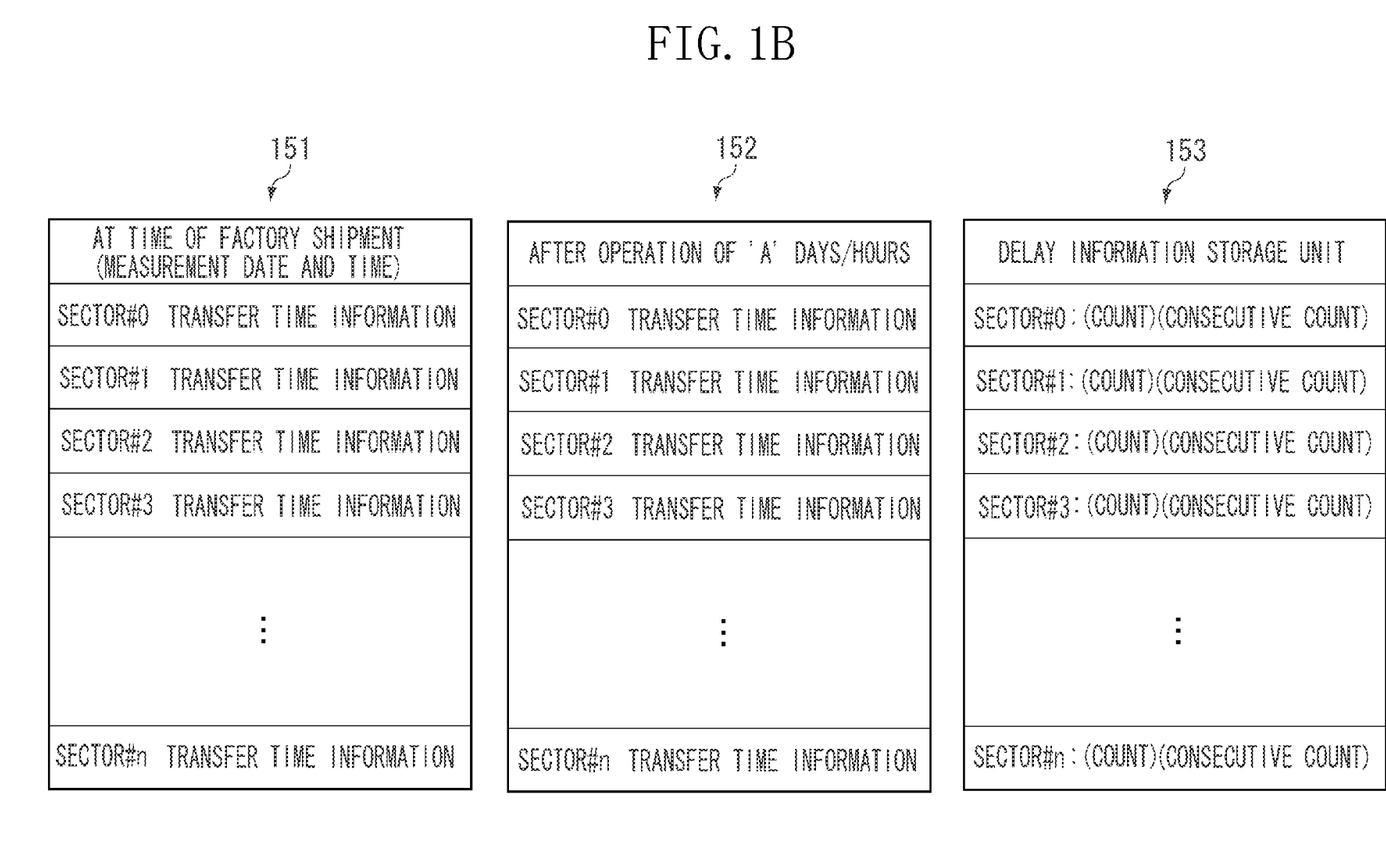
FIG. 1B illustrates a storage unit storing transfer time data.

A memory storing data transfer time information for each sector in the hard disk 108 will be described with reference to FIG. 1B. The data regarding transfer times is stored in a non-volatile memory like the NVRAM 105. A transfer-time-information-at-factory-shipment storage unit 151, which functions as the first storage unit, stores transfer time (first data transfer time) information of each sector in the hard disk 108 "at the time of factory shipment" of the transfer time information stored in the NVRAM 105. This data is initial data used as a reference to which a data transfer time (second data transfer time) information measured at a later date is compared. A transfer-time-information-after-factory-shipment storage unit 152, which functions as the second storage unit, stores transfer time information of each sector measured after several days have passed since an entry of the image forming apparatus 10 into the market. The CPU 101, which functions as a comparison unit, compares the transfer time information stored in the transfer-time-information-at-factory-shipment storage unit 151 with the current transfer time information stored in the transfer-time-information-after-factory-shipment storage unit 152 for each sector.

If a data transfer time after factory shipment is longer than a data transfer time at the time of factory shipment, the CPU 101 determines that a delay in transfer time occurs, and provides as a comparison result a total delay count which is the number of data sectors (data areas) where a delay occurs, out of all data sectors.

If a delay in transfer time occurs, and if a delay occurs at adjacent data areas (for example, the sector #0 and the sector #1 in FIG. 1B) consecutively, the CPU provides as a comparison result a consecutive delay count which is the number of consecutive delay data areas. For example, the consecutive delay count is 4 if the sector #3, the sector #4, the sector #5, and the sector #6 are data areas where a delay occurs consecutively.

A flow of transfer time measurement processing will now be described with reference to FIGS. 2A and 2B. In step S201, #0 is set to a specified sector number of the hard disk 108 as to which a transfer time is measured at the time of factory shipment and after the factory shipment (for example, at the time of hard disk maintenance by a serviceperson). In step S202, time measurement processing is started by the timer 112 which functions as the measurement unit. In step S203, the CPU 101, which functions as a data reading unit, starts reading the data area corresponding to the set specified sector number, out of multiple data areas into which the hard disk 108 is divided. CPU 101 is an example storage unit having multiple data areas. In step S204, the CPU 101 waits until occurrence of reading completion interrupt processing which would occur when the reading operation of the set data area is completed. In step S205, when the reading completion interrupt processing is performed, the time measurement started in step S202 is stopped. The transfer time is obtained from a value of time t measured in this way. In step S206, the value of the measured time t is stored as data into the specified area of the transfer-time-information-at-factory-shipment storage unit 151 which functions as the first storage unit. In step S207, the sector (m+1) adjacent to the measured sector number (m+0 or a larger integer) is set as the next time measurement target. In step S208, it is determined whether the sector number (m+1) is equal to the total number of the sectors "n+1: n is 0 or a larger integer". If the number of the already measured sector (m+1) is less than "n+1" (NO in step S208), the processing returns to step S202 to measure the next sector. On the other hand, if the number of the already measured sector (m+1) is equal to "n+1" (YES in step S208), this means that the measurement has been completed for all of the sectors, whereby the transfer time measurement is ended. The measurement at the time of factory shipment is completed in this way. The data transfer time measurement performed in steps S202 to S205 corresponds to data transfer rate (data access speed) measurement. For example, a short data transfer time means a fast data transfer rate, and a long data transfer time means a slow data transfer rate. In this case, it is assumed that all of the sectors have the same data capacity.

Next, processing after factory shipment will be described. In step S209, it is determined whether the set number of days have passed since the previous transfer time measurement. The number of days can be set through a software or the operation unit 109.

The transfer time measurement is performed at the image forming apparatus 10 every set number of days. In step S210, similarly to step S201, #0 is set to the sector number before a start of transfer time measurement for the hard disk 108. In step S211, it is determined whether the image forming apparatus 10 is in a standby state. If the image forming apparatus 10 is in a standby state (YES in step S211), steps S212 to S216 are performed. On the other hand, if the image forming apparatus 10 is not in a standby state (NO in step S211), the CPU 101 waits without performing transfer time measurement until the image forming apparatus 10 enters a standby state because accurate transfer time measurement is impossible when the image forming apparatus 10 is not in a standby state. If the image forming apparatus 10 is in a standby state (YES in step S211), steps S212 to S216 are performed. More specifically, each sector is measured in the same manner as the transfer time measurement at the time of factory shipment (steps S212 to S216 corresponds to steps S202 to S206). In step S217, it is determined again whether the image forming apparatus 10 is in a standby state after the transfer time measurement. As a result, if it is determined that the image forming apparatus 10 is not in a standby state (NO in step S217), the measurement is re-performed because there is a possibility that the measurement may be inaccurate. In step S218, the sector (m+1) adjacent to the measured sector number (m: 0 or a larger integer) is set as the next time measurement target. In step S219, it is determined whether the sector number (m+1) is equal to the total number of the sectors "n+1: n is 0 or a larger integer". If the number of the already measured sector (m+1) is less than "n+1" (NO in step S219), the processing returns to step S212 to measure the next sector. On the other hand, if the number of the already measured sector (m+1) is equal to "n+1" (YES in step S219), this means that the measurement has been completed for all of the sectors, so that the transfer time measurement is ended. The measurement at the time of a normal operation is completed in this way. The data transfer time measurement performed in steps S212 to S215 corresponds to data access speed measurement. For example, a short data transfer time means a fast data access speed, and a long data transfer time means a slow data access speed. In this case, it is assumed that all of the sectors have the same data capacity.

Figure 3A:
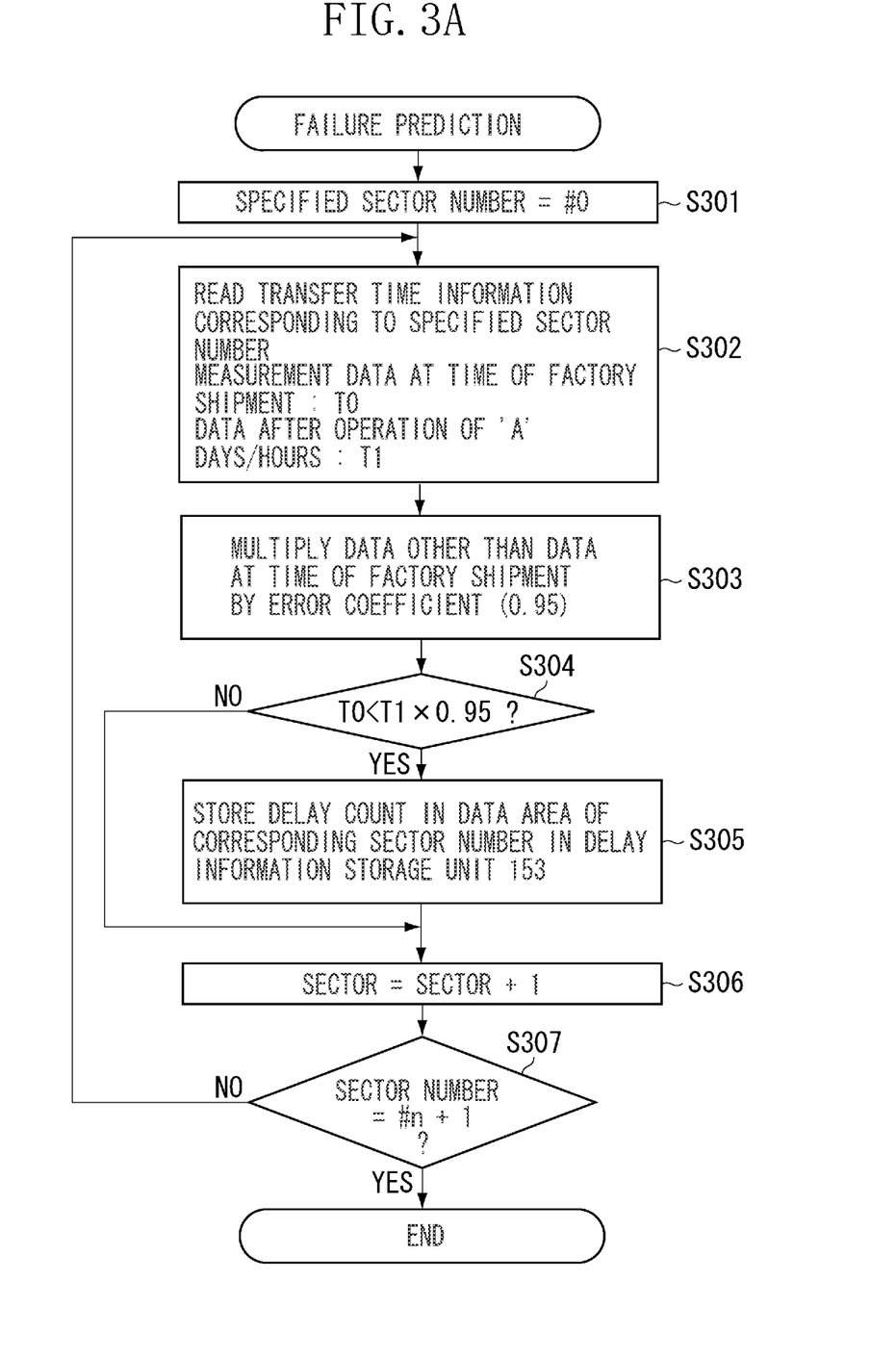
FIGS. 3A and 3B are flowcharts illustrating failure prediction and failure determination.

A method for predicting a failure of the hard disk 108 mounted on the image forming apparatus 10 will now be described with reference to FIG. 3A. In step S301, #0 is set to the specified sector number to compare the transfer time of the respective data areas in ascending order from the sector number #0. In step S302, the CPU 101, which functions as the data reading unit, reads transfer time information at the time of factory shipment stored in the transfer-time-information-at-factory-shipment storage unit 151 for each sector number. Similarly, the CPU 101, which functions as the data reading unit, reads transfer time information after the set number of days which is stored in the transfer-time-information-after-factory-shipment storage unit 152 for each sector number. In step S303, the transfer time (T1) after the set number of days which is read in step S302 is multiplied by a specified arbitrary coefficient (for example, 0.95 in FIG. 3A). The transfer time T1 is multiplied by a coefficient in this way, because a subtle difference is generated each time a transfer time of the hard disk 108 is measured, and an erroneous determination should be prevented from being made due to such a difference. In step S304, the transfer time (T0) measured at the time of factory shipment is compared with the measurement data (T1) after the set number of days which is multiplied by the coefficient (0.95). The comparison performed in step S304 may reveal a difference between a first data access speed and a second data access speed. If the transfer time (T0) of the measurement result at factory shipment is shorter (YES in step S304), the processing proceeds to step S305. Otherwise (NO in step S304), the processing proceeds to step S306. In step S305, if the transfer time after the set number of days which is multiplied by the coefficient is longer than the transfer time at the time of factory shipment, a delay count, which indicates the number of data areas where a delay in transfer time occurs, is incremented, and is stored in the data area of the corresponding sector number in a delay information storage unit 153. Further, a consecutive delay count, which indicates the number of data areas where a transfer time delay occurs consecutively, is incremented, and is stored in the data area of the corresponding sector number. In step S306, one is added to the sector number to compare transfer time information at the time of factory shipment and transfer time information after the set number of days for the next sector number. In step S307, it is determined whether the sector number is equal to "n+1". If the sector number is less than "n+1" (NO in step S307), the processing returns to step S302 to make a comparison for the next sector. On the other hand, if the sector number is equal to "n+1" (YES in step S307), this means that there is no more sectors, so that the transfer time comparison is ended. The data transfer time comparison performed in step S304 corresponds to data access speed comparison. For example, a short data transfer time means a fast data access speed, and a long data transfer time means a slow data access speed. In this case, it is assumed that all of the sectors have the same data capacity.

Figure 3B:
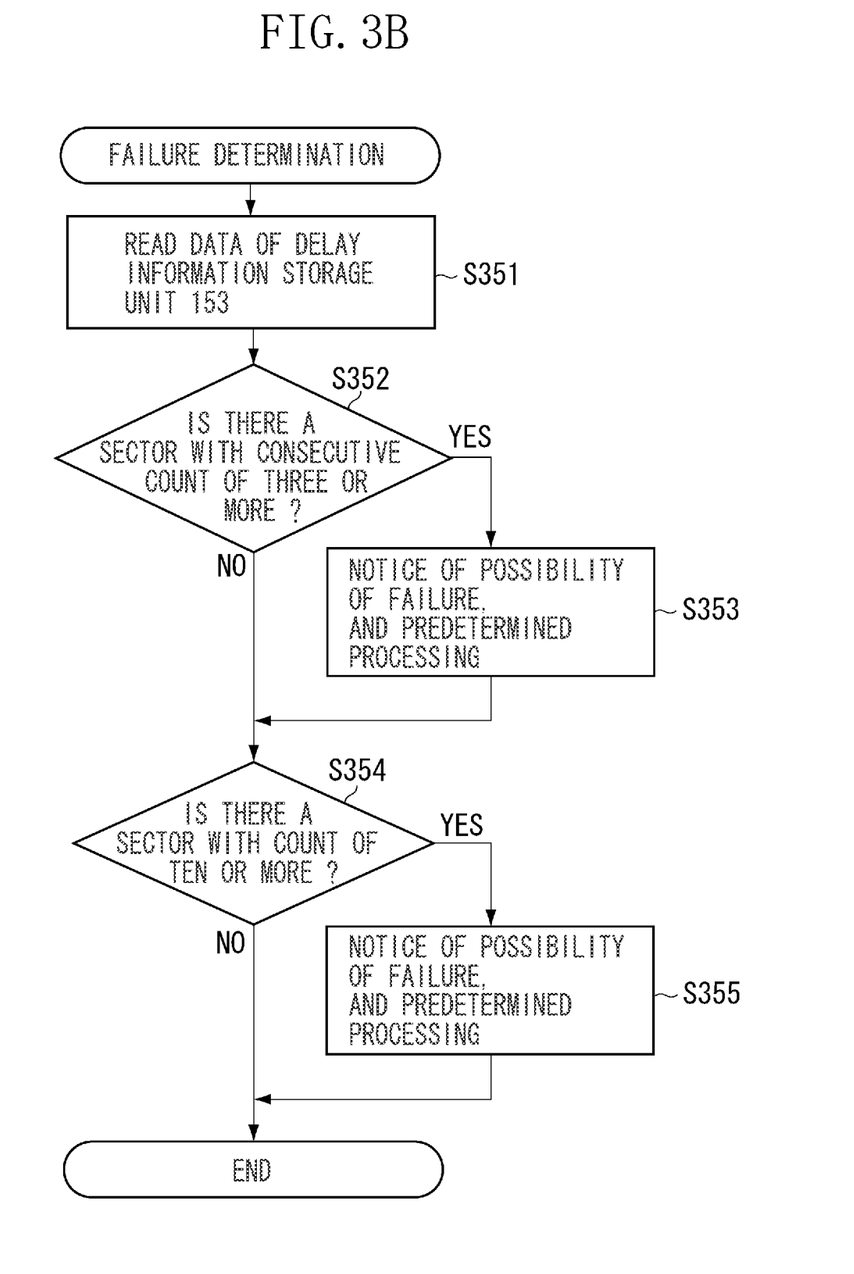

A failure determination method will now be described with reference to FIG. 3B. A defect may be viewed as a deficiency that may be subnormal in structure or function, for example, such as where the structure or function may have an irregularity or may not work properly. The defect may be reflected in or of a delay, a potential failure, or a failure of, for example, a data area. In step S351, the CPU 101 reads out the information stored in the delay information storage unit 153. In step S352, the CPU 101, which functions as a determination unit, determines whether there is a sector registered as the delay information sector with a count equal to or larger than a first threshold value (for example, three consecutive times), in the information stored in the delay information storage unit 153. In step S353, since a failure may occur at the hard disk 108 in the near future if there is a sector having a count equal to or more than the first threshold value (for example, three consecutive times), the CPU 101, which functions as the processing execution unit, notifies a user or a serviceperson that a failure may occur. Further, at this time, the CPU 101 restricts any application which uses that data area, and performs the processing for relocating the data to another sector. The notification and restriction may be in response to predicting occurrence of a failure at the hard disk 108 based on a defect detection result.

In step S354, the CPU 101, which functions as the determination unit, determines whether there is a sector registered as the delay information sector with a total count equal to or larger than a second threshold value (for example, ten times), in the information stored in the delay information storage unit 153. In step S355, if there is a sector registered as the delay information sector with a count equal to or more than ten times in the information stored in the delay information storage unit 153 (YES in step S354), then the CPU 101 notifies a user or a serviceperson that a failure may occur in the near future at the hard disk 108. Further, at this time, the CPU 101 restricts any application which uses that data area, and performs the processing of remapping and relocating the data to another sector.

Figure 4:
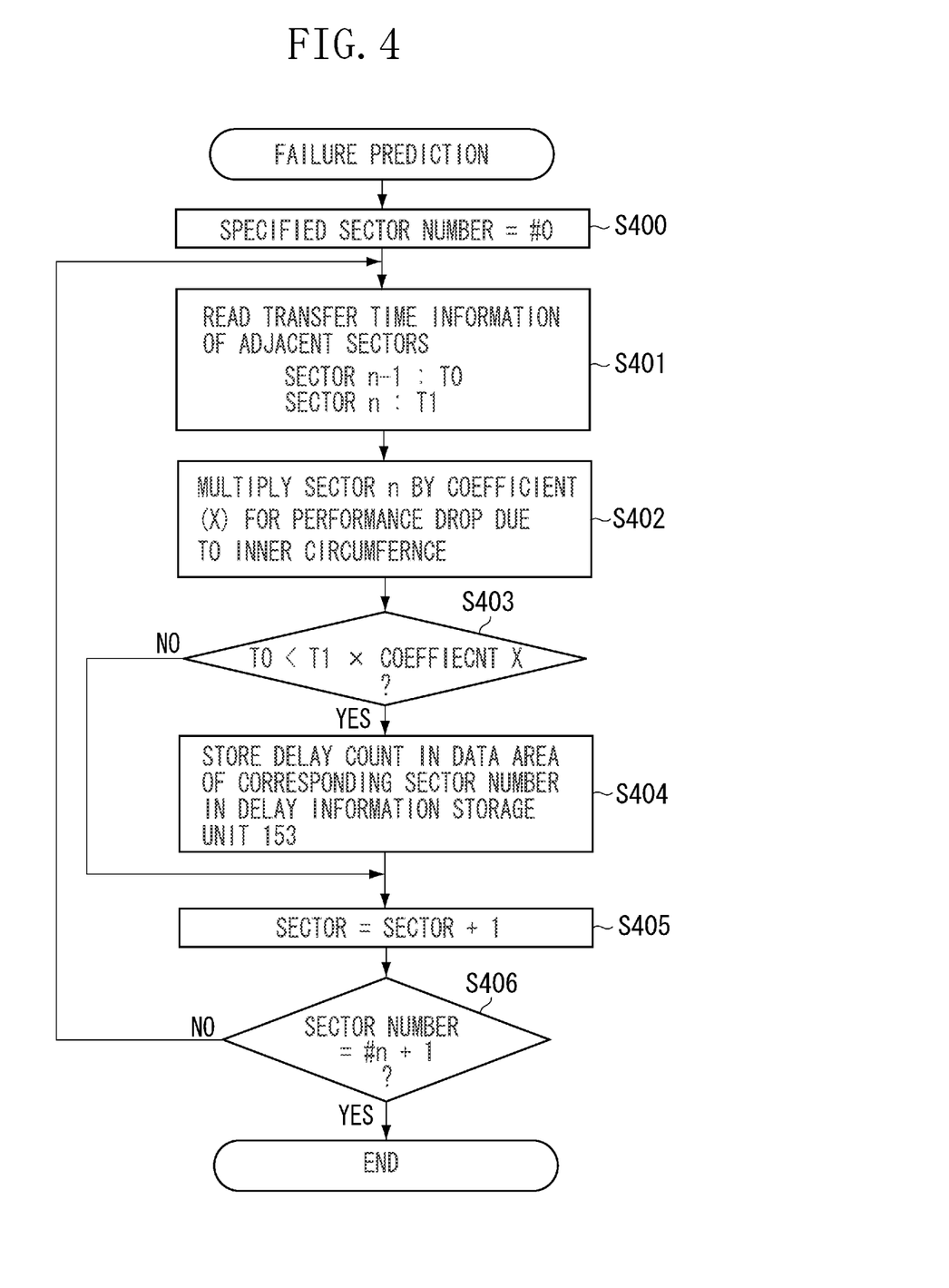
FIG. 4 is a flowchart illustrating failure prediction.
Figure 5A:
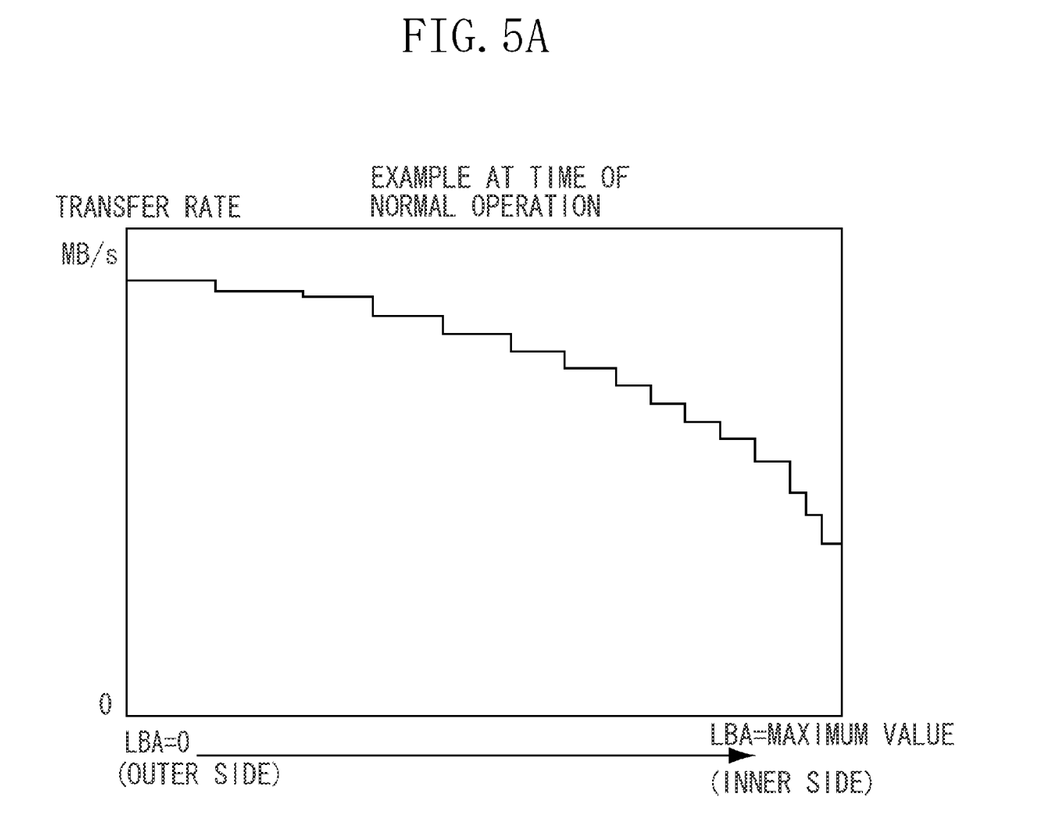
FIGS. 5A, 5B, and 5C illustrate a transfer rate transition of a hard disk at time of a normal operation and transfer rate transitions of a hard disk at the time of occurrence of a faulty operation.

Another failure prediction method will now be described with reference to FIG. 4. In step S400, #0 is set to the sector number. In step S401, the CPU 101 reads out the transfer time information of each of adjacent sectors (the sector n and the sector n−1) from the transfer-time-information-after-factory-shipment storage unit 152. Even in a normal hard disk, the transfer rate is fastest on the outermost circumferential side, and gets slower toward the inner circumferential side, as illustrated in FIG. 5A, which will be described below. Therefore, in step S402, the transfer time information on the inner circumferential side is multiplied by a performance drop coefficient X to compensate this difference. In step S403, the data transfer time (first data transfer time) information of the sector n−1 (first data area) which is an adjacent sector is compared with the data transfer time (second data transfer time) information of the sector n (second data area). At this time, a comparison is made in consideration of the performance drop on the inner circumferential side. If the transfer time (T1) of the sector n multiplied by the coefficient X is longer than the transfer time (T0) of the sector n−1 (YES in step S403), the processing proceeds to step S404. Otherwise (NO in step S403), the processing proceeds to step S405.

In step S404, the delay count is incremented for the data area of the corresponding sector number in the delay information storage unit 153, and the consecutive delay count is incremented and stored as consecutive delay count if a delay occurs consecutively from the adjacent data area. In step S405, one is added to the sector number to compare transfer time information at the time of factory shipment and transfer time information after the set number of days of the next sector number. In step S406, it is determined whether the sector number is equal to "n+1". If the sector number is less than "n+1" (NO in step S406), the processing returns to step S401 to compare the next sector. On the other hand, if the sector number is equal to "n+1" (YES in step S406), this means that there is no more sectors, and therefore the transfer time comparison is ended. The data transfer time comparison performed in step S403 corresponds to data access speed comparison. For example, a short data transfer time means a fast data access speed, and a long data transfer time means a slow data access speed. In this case, it is assumed that all of the sectors have the same data capacity.

The relationship between the transfer rate of the hard disk 108 at the time of factory shipment and logical block addressing (LBA) will be described with reference to FIG. 5A. The LBA is a method for assigning serial numbers to all sectors in the hard disk, and specifying the sectors by the assigned serial numbers. FIG. 5A indicates that the transfer rate of the hard disk 108 gets slower from the outer circumferential side to the inner circumferential side of the hard disk 108. Further, in a new hard disk 108, unlike those illustrated in FIGS. 5B and 5C which will be described below, it is unlikely that the transfer rate drastically drops at a certain LBA (refer to FIG. 5A). This is an example where the hard disk 108 functions normally.

Figure 5B:
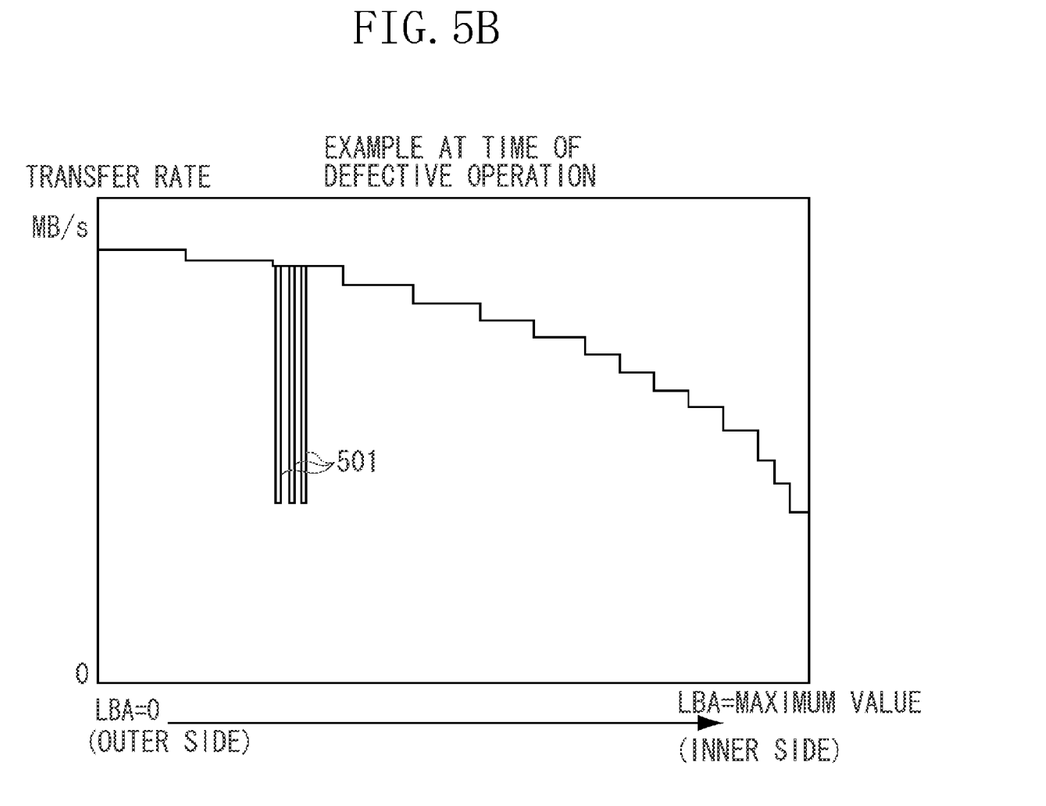

Next, referring to FIGS. 5B and 5C, a description will be given of the relationship between the transfer rate and the LBA when the transfer rate is calculated by measuring the transfer time of the image forming apparatus 10 where a failure has occurred at the hard disk 108 thereof in the market. The example illustrated in FIG. 5B is a common measurement result among analyzed hard disks 108, and the number 501 in FIG. 5B indicates that the transfer rate drastically drops around a certain sector. Since a failure rarely occurs at the hard disk 108 in this state, if the hard disk is not replaced by using the failure prediction method according to the present exemplary embodiment, data may be suddenly broken when a user is using it, or a system breakdown may occur.

Figure 5C:
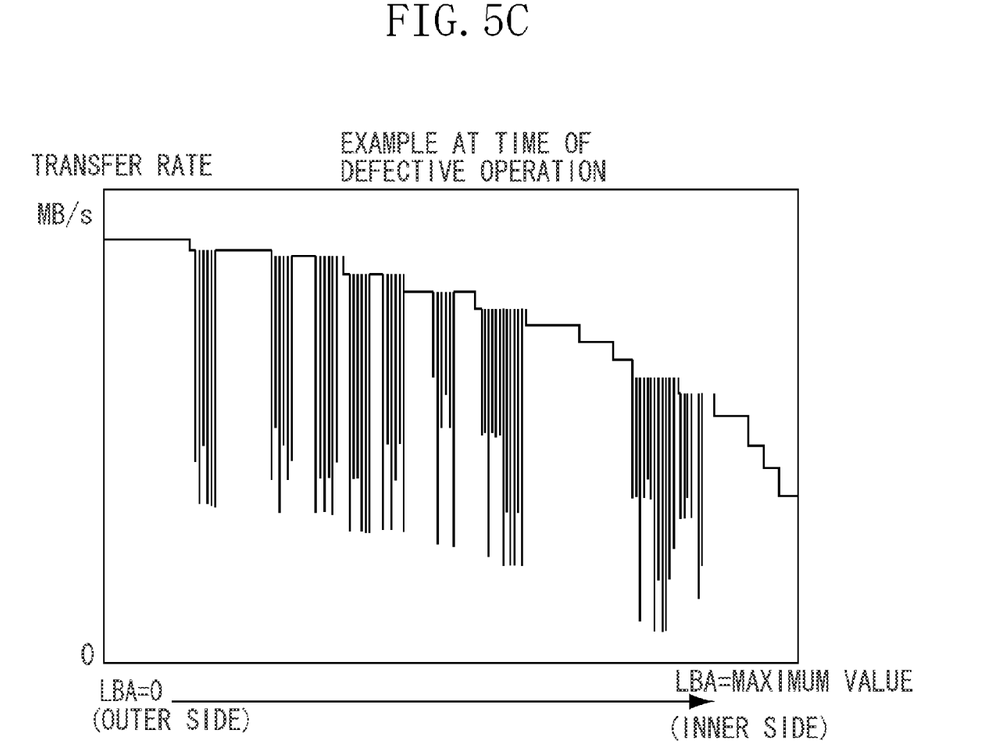

The example illustrated in FIG. 5C is a comparatively rare type of failure of the hard disk 108. The system of the image forming apparatus 10, if it reaches this state, cannot be started up any more.

On the other hand, a hard disk has the characteristic that, when a sector thereof is accessed repeatedly, the coating on that sector and its vicinity may be elevated, resulting in occurrence of an access trouble. In this case, however, a stop of accessing may be effective to level height of the coating and solve the access trouble. Therefore, after access to a sector having an access trouble is stopped for a certain time, the transfer time is measured again, and the above-mentioned restriction is lifted if the transfer time is recovered.

In the image forming apparatus 10 according to the present exemplary embodiment, a factory worker makes setting for the transfer time measurement through the operation unit 109 at the time of a factory shipment inspection (step S201). When the controller 100 receives it, time measurement is started by an activation of the timer 112 mounted on the controller 100 (step S202). Then, the direct memory access (DMA) reading is started as to the sector number #0 of the hard disk 108 (step S203). The CPU 101 waits until a DMA completion interrupt which would occur when data is read to reach a size set by the DMA setting (step S204). When the DMA completion interrupt occurs, the CPU 101 stops the timer 112, and stores the measured time at this time into the transfer-time-information-at-factory-shipment storage unit 151 prepared in the NVRAM 105 which is a non-volatile storage medium. This operation is repeated until the sector number reaches #n, in case that the hard disk 108 is divided into n+1 sectors.

Figure 2A:
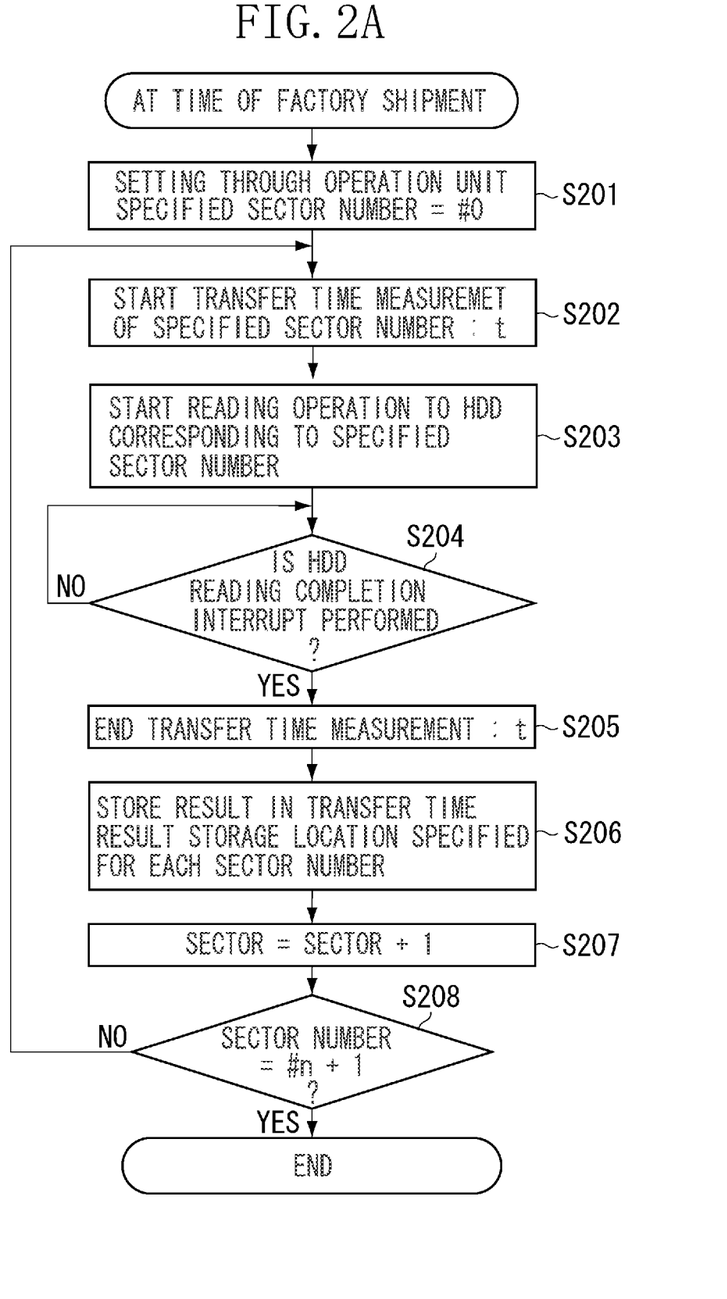
FIGS. 2A and 2B are flowcharts illustrating transfer time measurement.
Figure 2B:
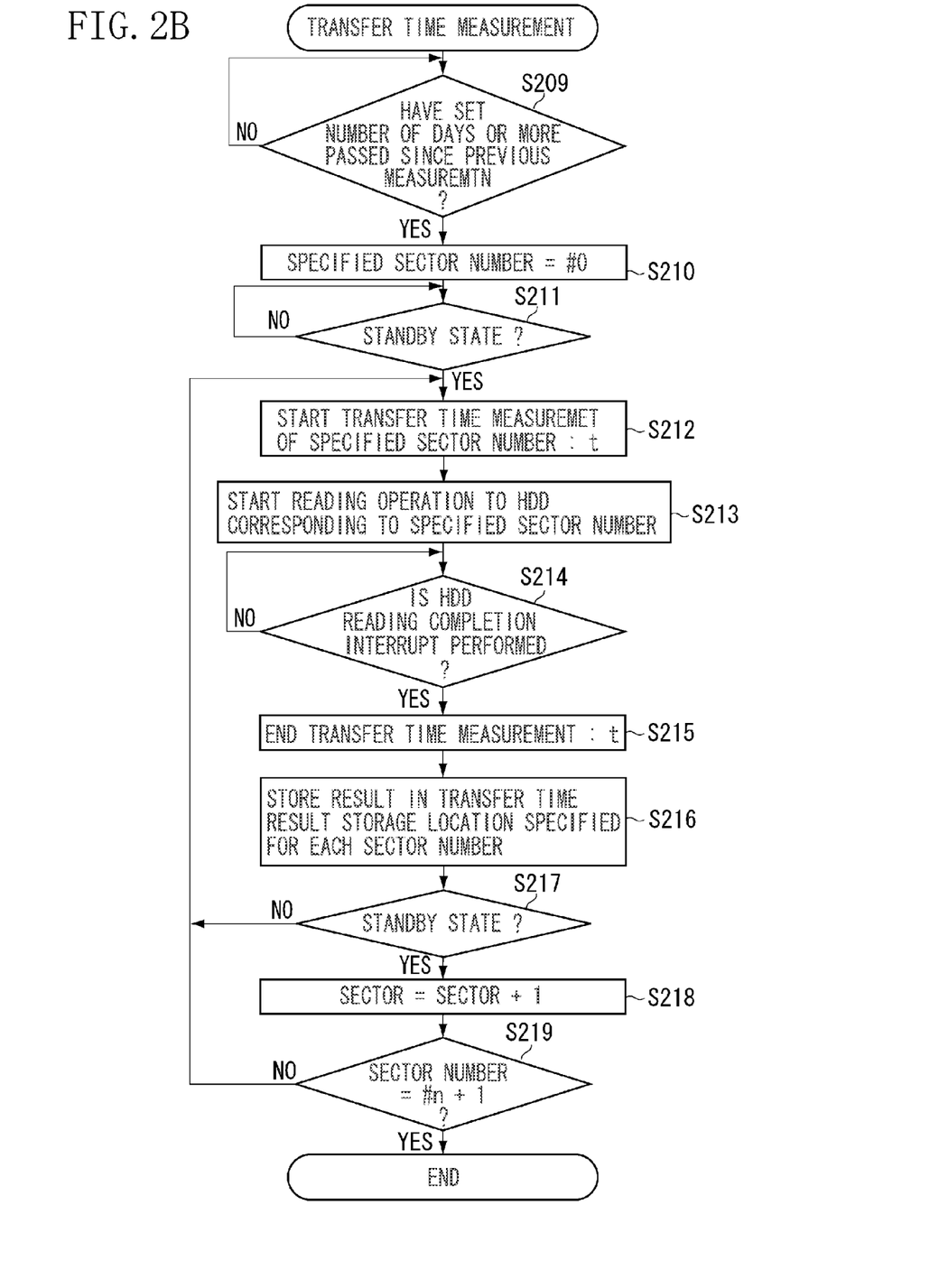

After the factory shipment, when a predetermined time (set time: for example, one week) registered in the firmware has passed since the transfer time measurement, the transfer time information is updated every week according to the transfer time measurement flowchart of FIG. 2. The updated transfer time measurement result is processed according to the failure prediction flowchart of FIG. 3A so that the updated current transfer time information is compared with the transfer time information at the time of the factory shipment for each sector number. Before the comparison, the updated transfer time is multiplied by the coefficient for preventing erroneous determination (for example, 0.95). If the updated transfer time multiplied by the coefficient is longer than the transfer time at the time of the factory shipment, it is determined that the transfer time is slowed down, and this delay occurrence is stored in the area for the corresponding sector number in the delay information storage unit 153. The above-mentioned operation is performed for all of the sectors from the sector #0 to the sector #n to complete the delay determination operation.

After the completion of the delay determination operation, the CPU 101 reads the data stored in the delay information storage unit 153, and checks whether there is a sector for which a delay is determined showing a count equal to or more than three consecutive times set as the first threshold value, and whether there is a sector for which a delay is determined showing a count equal to or more than ten times in total set as the second threshold value. If there is such a sector, the CPU 101 performs the processing of issuing a warning that a failure may occur at the hard disk in the near future to a user or a serviceperson.

Further, in the image forming apparatus 10, an access restriction is imposed so that any application using the corresponding sector does not perform data processing associated with that sector, another sector is assigned as an area for data processing and remapping is performed, and the processing for restricting a use of the corresponding sector is performed.

After the restriction of access to the sector is continued for a certain time, the transfer time is measured again, and if the delay in the transfer time is solved, the processing for lifting the restriction of access to the sector and allowing use of the restricted application is performed. The comparison method is not limited to the above-mentioned method. As an example of another method, the comparison may be made by periodically comparing adjacent data areas as illustrated in FIG. 4.

As mentioned above, it is possible to detect an increase in an access time, and evacuate user data and other data stored in the hard disk before a breakdown of the hard disk by issuing a warning to a user and a serviceperson in this case.

According to the present exemplary embodiment, it is possible to detect a slowdown of an access speed, and evacuate user data and other data stored in the hard disk before a breakdown of the hard disk by issuing a warning to a user and a serviceperson in this case.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). Here, the computer-readable medium may store a program that causes an image forming apparatus to perform a method described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-223459 filed Sep. 28, 2009, which is hereby incorporated by reference herein in its entirety.

What is claimed is:

1. An information processing apparatus including a storage unit having a plurality of data areas, the information processing apparatus comprising:
   a measurement unit configured to measure a first data access speed in a first data area of the storage unit and a second data access speed in a second data area of the storage unit; and
   a detection unit configured to detect a defect at the first data area based on difference between the first data access speed and the second data access speed.

2. The information processing apparatus according to claim 1, wherein the first data area and the second data area are data areas adjacent to each other.

3. The information processing apparatus according to claim 1, further comprising a prediction unit configured to predict occurrence of a failure at the storage unit based on a defect detection result by the detection unit.

4. The information processing apparatus according to claim 3, wherein the prediction unit predicts the occurrence of the failure at the storage unit if a first defect count of a total number of data areas where a defect is detected by the detection unit exceeds a predetermined threshold value.

5. The information processing apparatus according to claim 3, wherein the prediction unit predicts the occurrence of the failure at the storage unit if a second defect count a total number of times that a defect is detected at a certain data area by the detection unit exceeds a predetermined threshold value.

6. The information processing apparatus according to claim 3, further comprising an execution unit configured to execute processing for dealing with a failure when the prediction unit predicts the occurrence of the failure at the storage unit.

7. A method for controlling an information processing apparatus including a storage unit having a plurality of data areas, the method comprising:
   measuring a first data access speed in a first data area of the storage unit and a second data access speed in a second data area of the storage unit; and
   detecting a defect at the first data area based on difference between the first data access speed and the second data access speed,
   wherein the measuring and the detecting are executed by at least one processor.

8. The method according to claim 7, wherein the first data area and the second data area are data areas adjacent to each other.

9. The method according to claim 7, further comprising predicting occurrence of a failure at the storage unit based on a defect detection result.

10. The method according to claim 9, wherein predicting includes predicting the occurrence of the failure at the storage unit if a first defect count of a total number of data areas where a defect is detected exceeds a predetermined threshold value.

11. The method according to claim 9, wherein predicting includes predicting the occurrence of the failure at the storage unit if a second defect count a total number of times that a defect is detected at a certain data area exceeds a predetermined threshold value.

12. The method according to claim 9, further comprising executing processing for dealing with a failure when predicting the occurrence of the failure at the storage unit.

13. A non-transitory storage medium storing a program that causes an information processing apparatus including a storage unit having a plurality of data areas to execute a method, the method comprising:
   measuring a first data access speed in a first data area of the storage unit and a second data access speed in a second data area of the storage unit; and
   detecting a defect at the first data area based on difference between the first data access speed and the second data access speed.

* * * * *